(12) United States Patent
Reimer et al.

(10) Patent No.: US 6,892,266 B2
(45) Date of Patent: May 10, 2005

(54) MULTICORE DSP DEVICE HAVING COUPLED SUBSYSTEM MEMORY BUSES FOR GLOBAL DMA ACCESS

(75) Inventors: Jay B. Reimer, Houston, TX (US); Harland Glenn Hopkins, Missouri City, TX (US); Tai H. Nguyen, Houston, TX (US); Yi Luo, Stafford, TX (US); Kevin A. McGonagle, Sugarland, TX (US); Jason A. Jones, Houston, TX (US); Duy Q. Nguyen, Austin, TX (US); Patrick J. Smith, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 482 days.

(21) Appl. No.: 10/008,696

(22) Filed: Nov. 8, 2001

(65) Prior Publication Data

US 2002/0059393 A1 May 16, 2002

Related U.S. Application Data

(60) Provisional application No. 60/249,083, filed on Nov. 15, 2000.

(51) Int. Cl.$^7$ .............................................. G06F 13/14
(52) U.S. Cl. ...................... 710/305; 710/308; 710/309
(58) Field of Search .................................. 710/305, 308, 710/309, 240, 241, 244; 711/147, 148, 153, 130

(56) References Cited

U.S. PATENT DOCUMENTS 4,718,006 A    1/1988  Nishida
5,182,801 A    1/1993  Asfour
5,581,734 A  * 12/1996  DiBrino et al. .............. 711/169
5,584,010 A  * 12/1996  Kawai et al. ................ 711/117
5,625,796 A    4/1997  Kaczmarczyk et al.
5,838,934 A  * 11/1998  Boutaud et al. ............. 710/305
6,058,458 A  *  5/2000  Lee ............................. 711/148
6,609,188 B1 *  8/2003  Dunton ........................ 712/18

OTHER PUBLICATIONS

Winderweedle, Bill; *TMS320VC5420 to TMS320VC5421 DSP Migration*, Dec., 1999, p. 9.

* cited by examiner

Primary Examiner—Khanh Dang
(74) Attorney, Agent, or Firm—Robert D. Marshall, Jr.; W. James Brady, III; Frederick J. Telecky, Jr.

(57) ABSTRACT

A DSP device is disclosed having multiple DMA controllers with global DMA access to all volatile memory resources in the DSP device. In a preferred embodiment, each of the DMA controllers is coupled to each of the memory buses and is configured to control each of the memory buses. A memory bus multiplexer may be coupled between the subsystem memory bus and each of the DMA controllers, and an arbiter may be used to set the memory bus multiplexer so as to allow any one of the DMA controllers to control the memory bus. The memory bus may also be controlled by the host port interface via the memory bus multiplexer. A round-robin arbitration technique is used to provide each of the controllers and the host port interface fair access to the memory bus. This approach may advantageously provide increased flexibility in the use of DMA controllers to transfer data from place to place, with only a minimal increase in complexity.

10 Claims, 2 Drawing Sheets

MULTICORE DSP DEVICE HAVING COUPLED SUBSYSTEM MEMORY BUSES FOR GLOBAL DMA ACCESS

CROSS-REFERENCE TO RELATED APPLICATIONS

This application claims priority under 35 USC §119(e)(1) of Provisional Application No. 60/249,083, filed Nov. 15, 2000.

STATEMENT REGARDING FEDERALLY SPONSORED RESEARCH OR DEVELOPMENT

Not applicable.

BACKGROUND OF THE INVENTION

The present invention generally relates to digital signal processors. More particularly, the invention relates to dedicated subsystem memory buses in digital signal processors. Still more particularly, the invention relates to a coupling of dedicated subsystem memory buses that allows for global memory access from any given subsystem memory bus.

Microprocessors generally include a variety of logic circuits fabricated on a single semiconductor chip. Such logic circuits typically include a processor core, memory, and numerous other support components. Some microprocessors, such as digital signal processors (DSPs) provided by Texas Instruments, may include multiple processor subsystems each having its own processor core. Each processor subsystem includes memory and other support components for the associated processor core.

DSPs are generally sought for computationally intensive tasks because they have hardware specially designed for high performance computing. The processor subsystems which may be found on multi-core DSPs typically have dedicated buses. For example, a processor subsystem may have a dedicated instruction bus that the processor core uses to retrieve program instructions from memory, a dedicated data bus that the processor core uses to retrieve data from memory, and a dedicated direct memory access (DMA) memory bus distinct from the instruction and data buses. The DMA memory bus may be a used to move data in and out of the memory without any intervention from the processor core.

The DMA memory bus in each processor subsystem typically operates under the control of an associated subsystem DMA controller. Because multiple subsystem DMA controllers exist in the DSP device, DMA data transfers between subsystems require cooperation between different DMA controllers. An efficient method for performing such transfers would be desirable.

BRIEF SUMMARY OF THE INVENTION

Accordingly, the present invention contemplates coupling of the subsystem DMA memory buses in a manner that provides each DMA controller with global DMA access to all volatile memory resources in the DSP device. In a preferred embodiment, each of the DMA controllers is coupled to each of the memory buses and is configured to control each of the memory buses. A memory bus multiplexer may be coupled between the subsystem memory bus and each of the DMA controllers, and an arbiter may be used to set the memory bus multiplexer so as to allow any one of the DMA controllers to control the memory bus. The memory bus may also be controlled by the host port interface via the memory bus multiplexer. A round-robin arbitration technique is used to provide each of the DMA controllers and the host port interface fair access to the memory bus. This approach may advantageously provide increased flexibility in the use of DMA controllers to transfer data from place to place, with only a minimal increase in complexity.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the present invention is discussed below in the context of a multi-core, fixed-point, digital signal processor (DSP) chip. This embodiment, however, is not intended to limit the scope of this disclosure to this context, rather, the preferred embodiment may have applicability to any multiple core DSP device that would benefit from global DMA access.

Figure 1:
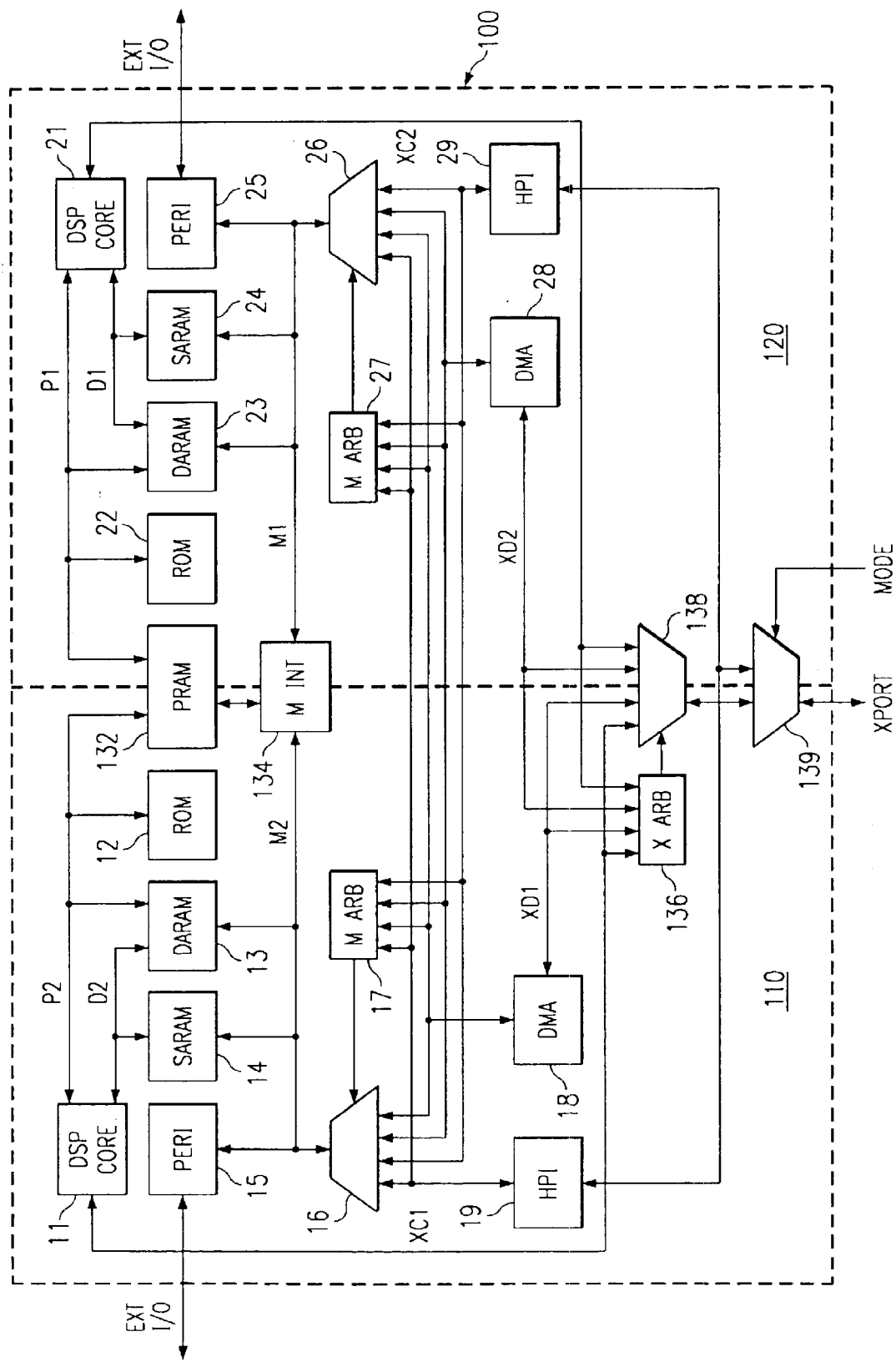
FIG. 1 shows a DSP device having subsystem DMA buses coupled together.

Turning now to the figures, FIG. 1 shows a DSP chip 100 that includes multiple DSP subsystems 110, 120, a shared program memory (PRAM) 132, a memory bus interface 134, an external I/O port (XPORT) arbiter 136, an XPORT multiplexer 138, and a host port interface (HPI) multiplexer 139. Each DSP subsystem 110, 120 (generally separated by the dashed line in FIG. 1) preferably includes a DSP core 11, 21, a read-only memory (ROM) 12, 22, a dual-access, random access memory (DARAM) 13, 23, a single-access, random access memory (SARAM) 14, 24, one or more peripheral devices 15, 25, an M-bus multiplexer 16, 26, an M-bus arbiter 17, 27, a DMA controller 18, 28, a host port interface (HPI) 19, 29, and other miscellaneous support circuitry. The subsystems 110, 120 each further include an instruction bus P1, P2, a data bus D1, D2, a memory bus M1, M2, a processor core external I/O bus XC1, XC2, and a DMA controller external I/O bus XD1, XD2.

The shared program memory (PRAM) 132 preferably is reserved for program instructions, and includes 16 blocks of dual-access RAM. Each block comprises 16 kilobytes of storage, although the block size and number of blocks can be varied as desired. Each DSP subsystem 110, 120 can fetch an instruction from any location in the PRAM 132 during each clock cycle. The processor cores 11, 21 concurrently fetch and execute distinct instructions from a single program stored in the PRAM 132. Although the DSP cores may execute the same software program, they do not necessarily execute the same instructions concurrently or necessarily follow the same branches in program flow.

According to the preferred embodiment, the DSP cores 11, 21 are not permitted to write to the PRAM 132. Instead, a host processor (not shown) provides the software to the PRAM 132 via the XPORT, HPI 19, 29 and memory buses M1, M2 as described further below.

The memory bus interface 134 is coupled to PRAM 132 and to the memory buses M1, M2. The memory bus interface 134 provides a set of first-in, first-out (FIFO) buffers that the memory buses M1, M2 can write to and read from. Each FIFO buffer is one way, that is, written to by one memory bus and read by the other. This provides one method of inter-subsystem communication. The memory bus interface 134 also couples both memory buses M1, M2 to PRAM 132. The memory bus interface includes an arbiter which grants one of the memory buses access to PRAM when such accesses are sought. The initial programming of the PRAM and updates of the PRAM are typically performed via the memory buses.

The XPORT arbiter 136 and XPORT multiplexer 138 are coupled to the processor cores 11, 21 and the DMA controllers 18, 28 in each of the subsystems via respective external I/O buses XC1, XC2, XD1, XD2. The processor cores and DMA controllers arbitrate for external access as explained further below, and the arbiter 136 sets the multiplexer 138 in accordance with the arbitration results. The DSP 100 is provided in a semiconductor package that has multiple pins ("leads") to provide external connections for the chip. The package leads used by the XPORT for external access are preferably shared with the host port interface units 19, 29. Accordingly, the output from XPORT multiplexer 138 is coupled to the HPI multiplexer 139, as are the HPI units 19, 29. When the host processor asserts the MODE signal (which is the control signal for the HPI multiplexer 139) the XPORT pins are coupled to the HPI units 19, 29, and the host processor accesses the DSP device 100 as a memory-mapped device. When the host processor de-asserts the MODE signal, the XPORT leads are coupled to the XPORT multiplexer 138, and any external accesses are initiated by the cores 11, 21 or the DMA controllers 18, 28, as explained further below.

The processor cores 11, 21 preferably execute software instructions retrieved via corresponding instruction buses P1, P2 to operate on data retrieved via corresponding data buses D1, D2. Results are returned from the processor cores on the data buses. The processor cores typically include an optimized arithmetic logic unit (ALU) and a control unit. The control unit retrieves data and instructions and decodes the instructions, and the ALU operates on the data as specified by the instructions.

The ROMs 12, 22 are non-volatile memories coupled to the corresponding instruction buses P1, P2. The ROMs preferably store boot-up software for initializing the subsystems. The DARAMs 13, 23 preferably include four memory blocks, each of which support two memory accesses per clock cycle. The DARAMs 13, 23 are intended primarily for data storage, but may be used to store program instructions as well. Accordingly, they are coupled to both the corresponding instruction buses P1, P2 and to the corresponding data buses D1, D2. A register (not shown) in the DSP core 11, 21 determines whether the DARAM 13, 23 is mapped into program memory space or data memory space. The SARAMs 14, 24 preferably also include four memory blocks, each of which support one memory access per clock cycle. Each SARAM preferably is reserved for data storage, and accordingly is coupled to the corresponding data bus D1, D2.

Referring still to FIG. 1, instruction buses P1, P2 couple together the corresponding processor core 11, 21, the local DARAM 13, 23, the local ROM 12, 22, and the shared PRAM 132. Data buses D1, D2 couple together the corresponding processor core 11, 21, the local DARAM 13, 23, and the local SARAM 14, 24. Memory buses M1, M2 couple the memory bus multiplexer 16, 26 with each of the volatile memory devices 13, 14, 23, 24, 132 in the corresponding subsystem. The memory buses also couple to peripheral devices 15, 25.

Peripheral devices 15, 25 preferably each include one or more multi-channel, serial interfaces. The multi-channel serial interfaces provide high-speed, full-duplex, double-buffered serial communications. The configuration of these ports is preferably programmable by the associated processor core to allow direct interfacing with existing serial protocols. Each serial interface 15, 25 preferably supports multi-channel transmit and receive of up to 128 channels. The multi-channel serial ports perform time division multiplexing and de-multiplexing when multiple channels are enabled. Each data frame that is sent or received represents a time-division multiplexed (TDM) data stream, so that the content of one channel is interleaved with the contents of the other channels.

Memory bus multiplexers 16, 26 and memory bus arbiters 17, 27 are each coupled to all DMA controllers 18, 28 and HPI units 19, 29. The local DMA controller 18, the local HPI unit 19, the remote DMA controller 28, and the remote HPI unit 29 can each control memory bus M1 via memory bus multiplexer 16 to access peripherals 15, SARAM 14, DARAM 13, and PRAM 132. Similarly, each of them can control memory bus M2 via memory bus multiplexer 26 to access peripherals 25, SARAM 24, DARAM 23, and PRAM 132. Accordingly, each of the DMA controllers has global access, as does each of the HPI units. Arbitration among the local DMA controller, the local HPI unit, and the remote subsystem for access to memory bus Ml is performed by arbiter 17, which then sets the memory bus multiplexer 16 in accordance with the arbitration winner. Multiplexer 26 and arbiter 27 operate similarly for accesses via memory bus M2.

Each DMA controller 18, 28 moves data and instructions to and from local peripherals and data storage devices, and to shared PRAM 132, via the corresponding memory bus M1, M2. Each DMA controller 18, 28 can also move data to and from remote peripherals and data storage devices via the remote memory bus. Finally, each DMA controller can move data to and from external sources via an external I/O bus XD1, XD2 and the XPORT. Although the transfers may be initiated in different ways, including initiation by the processor core, the transfers are thereafter performed "in the background", i.e., without active monitoring and control by the processor core. Each DMA controller preferably provides multiple "channels" for the independent, concurrent management of multiple block transfers. DMA transfers are accomplished by first reading the data into memory internal to the DMA controller, and then writing the data from the DMA controller memory to the desired destination. When processor core memory accesses to internal memory conflict with DMA controller accesses, the DMA controller accesses are preferably given higher priority.

The HPI units 19, 29 allow an external host processor to access all internal memory via the memory buses M1, M2. To keep the overall system design simple, the host processor interfaces 19, 29 are designed to mimic a memory interface. That is, the host processor can "view" the contents of any memory location internal to the DSP device 100 and many of the processor core registers by sending an address to the HPI units 19, 29 indicating the desired location. One of the HPI units 19, 29 then retrieves the desired information and provides the information as data in the same way that a memory device would. The HPI units 19, 29 can similarly store data in the desired location. The software to be executed by the processor cores may be provided by the host processor in this manner. That is, the host processor may write the software to shared PRAM 132 via the HPI 19, 29. The HPI units 19, 29 preferably act as a slave device to the host processor, but may generate a signal to the host processor to stall the host processor during an access if the memory buses M1, M2 are busy with other tasks.

Figure 2:
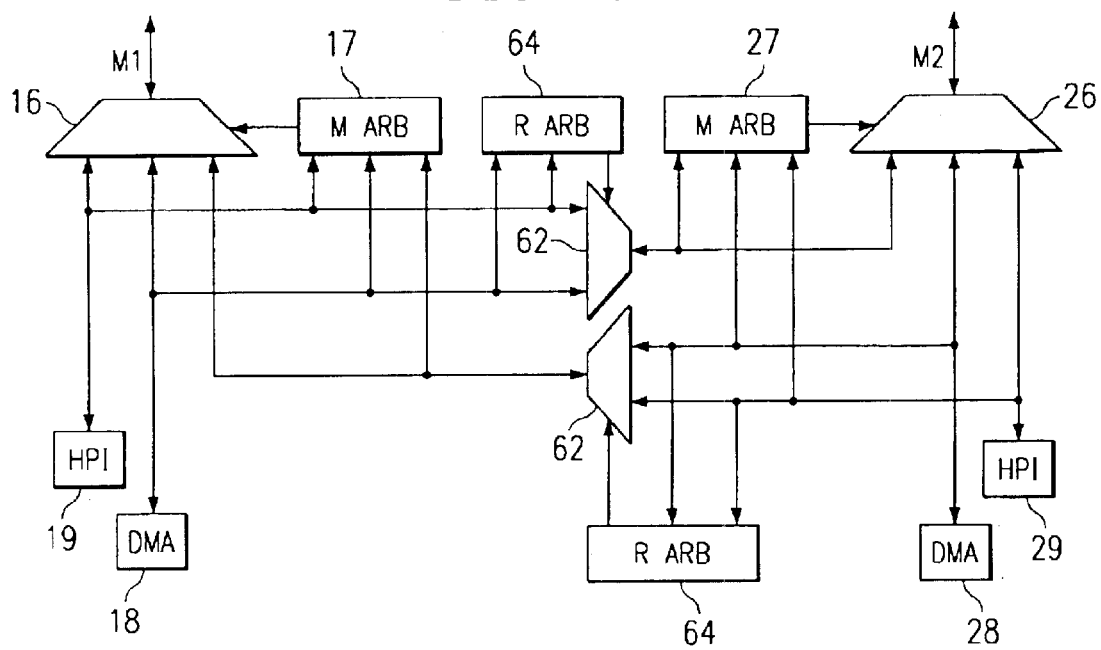
FIG. 2 shows an alternative configuration for coupling the DMA buses together.

FIG. 2 shows an alternative embodiment for coupling the DMA controllers 18, 28 and HPI units 19, 29 to the memory buses M1, M2. Remote-access multiplexers 62 and remote access arbiters 64 have been added. If the local DMA controller or local HPI unit (e.g. 18, 19) seeks access to a remote memory bus (e.g., M2), a remote access arbiter 64 detects the access request and sets a remote access multiplexer 62 accordingly. The remote access arbiters 64 resolve conflicts on a rotating priority basis. That is, if the remote DMA controller wins an access conflict with the remote HPI unit in a given clock cycle, the remote HPI will be given priority the next time a conflict occurs with the remote DMA controller.

The output of the remote access multiplexer 62 is received by the remote memory bus arbiter and multiplexer (e.g., 26, 27). The memory bus arbiter (e.g. 27) arbitrates between its local DMA controller (e.g. 28), its local HPI unit (e.g. 29), and the remote access via multiplexer 62, and sets the memory bus multiplexer in accordance with the arbitration winner.

Each of the multiplexers 16, 26, 62 preferably grants only one access at a time. The accesses which are not immediately granted will be granted in due course. Accordingly, the DMA controllers and HPI units simply maintain their access attempts until access is granted.

Figure 3:
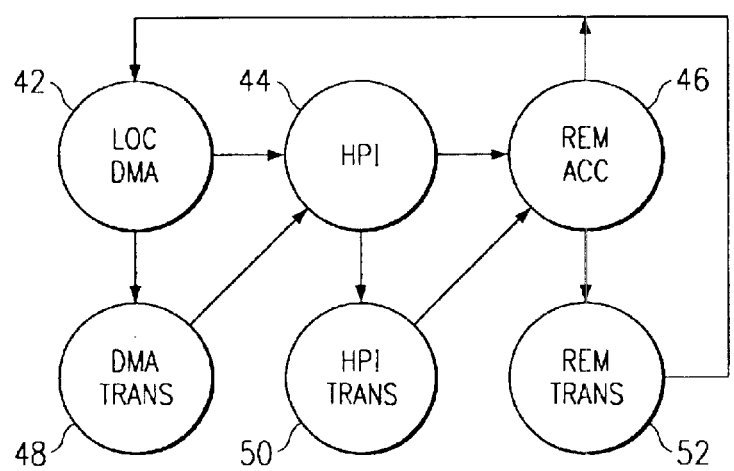
FIG. 3 shows a high-level state machine diagram of a memory bus arbiter.

FIG. 3 shows an illustrative high-level state diagram that may be implemented by memory bus arbiters 17, 27. In the absence of any attempted memory bus accesses, the memory bus arbiter continuously and sequentially checks for local DMA access requests 42, HPI access requests 44, and remote access requests 46. The local DMA access requests come from the local DMA controller, HPI access requests are made by the local HPI unit, and remote access requests may come from a remote access multiplexer 62 or alternatively directly from a remote DMA controller or HPI unit. If no local DMA access request is detected, the memory bus arbiter 17, 27 checks for HPI access requests 44. If no HPI access request is detected, the memory bus arbiter checks for remote DMA access requests 46. If no remote DMA access request is detected, the memory bus arbiter again checks for local DMA access requests 42. The memory bus arbiter 17, 27 checks the various access request sources sufficiently rapidly to initiate a memory bus access the clock cycle after it is received, assuming that the requested access wins this round-robin arbitration scheme.

If the memory bus arbiter 17, 27 detects a local DMA access request, the memory bus arbiter sets the memory bus multiplexer 16, 26 and allows the DMA controller 18, 28 to perform a memory bus transaction 48. The DMA controller normally transfers data in two steps: a read from the source to internal memory in the DMA controller, followed by a write from the internal memory to the desired destination. The memory bus transaction may accordingly be a read or a write. The read step and the write step of a DMA transfer may be separated by other memory bus transactions, e.g. an HPI transaction 50 or a remote access transaction. After the DMA memory bus transaction is completed, the memory bus arbiter resumes checking, beginning with HPI access requests 44.

If the DMA controller 18, 28 detects an HPI access request 44, the DMA controller performs the HPI transaction 50. Again, the transaction may be a read access or a write access. In a read access, the HPI unit retrieves information requested by a host processor. In a write access, the HPI unit stores information from the host processor in the desired location. After the transaction is completed, the memory arbiter resumes checking, beginning with the remote DMA access requests 46.

If the memory arbiter 17, 27 detects a remote access request, the memory arbiter allows the remote DMA controller or remote HPI unit (via the remote access multiplexer) to perform a remote access transaction 52 on the memory bus. The transaction may be a read access or a write access performed in a manner similar to that described above. After completion of the transaction, the memory arbiter resumes checking, beginning with local DMA requests 42.

In the embodiments of FIGS. 1 and 2, the DSP chip 100 includes only two DSP subsystems 101, 102. As one skilled in the art will appreciate, there may be more than two DSP subsystems, each having a corresponding processor core.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A digital signal processing system, comprising:
    a plurality of processor subsystems that each include:
        at least one memory device; and
        a memory bus multiplexer coupled to each of said at least one memory device by a subsystem memory bus; and
        a direct memory access (DMA) controller,
        an input/output peripheral coupled to the subsystem memory bus,
    wherein each of the DMA controllers is coupled to each of said memory bus multiplexers of each of said plurality of processor subsystems and is configured to access each of said memory devices of each of said plurality of processor subsystems via the corresponding subsystem memory bus, and
    wherein each of the DMA controllers is configured to access each of the peripherals via the corresponding subsystem memory bus.

2. A digital signal processing system, comprising:
    a plurality of processor subsystems that each include:
        at least one memory device; and
        a memory bus multiplexer coupled to each of said at least one memory device by a subsystem memory bus; and a direct memory access (DMA) controller,
a host port interface (HPI) unit coupled to the memory bus multiplexer and configured to access the memory device via the subsystem memory bus; and
a remote access multiplexer coupled between the memory bus multiplexer and all DMA controllers outside the processor subsystem, wherein the remote access multiplexer is further coupled between the memory bus multiplexer and all HPI units outside the processor subsystem,
wherein each of the DMA controllers is coupled to each of said memory bus multiplexers of each of said plurality of processor subsystems and is configured to access each of said memory devices of each of said plurality of processor subsystems via the corresponding subsystem memory bus;
wherein each of the HPI units is coupled to each of the memory bus multiplexers and is configured to access each of the memory devices via the corresponding subsystem memory bus wherein each of the HPI units is coupled to each of the memory bus multiplexers and is configured to access each of the memory devices via the corresponding subsystem memory bus; and
wherein the memory bus multiplexer is configured to couple to the memory bus at any one time exactly one of the HPI unit, the DMA controller, and the remote access multiplexer.

3. The system of claim 2, wherein each of the plurality of processor subsystems further includes:
a remote access arbiter coupled to the remote access multiplexer and configured to set the remote access multiplexer to couple to the memory bus multiplexer at any one time exactly one of the HPI units and DMA controllers outside the processor subsystem.

4. The system of claim 2, wherein each of the plurality of processor subsystems further includes:
a memory bus arbiter coupled to the memory bus multiplexer to arbitrate between access requests received from the HPI unit, the DMA controller, and the remote access multiplexer, wherein said arbitration is performed on a round-robin basis.

5. A digital signal processor chip, comprising:
a plurality of memory bus multiplexers, each of the memory bus multiplexers is coupled to one or more corresponding memory devices by a corresponding memory bus;
a plurality of DMA controllers each coupled to each of the plurality of memory bus multiplexers, each of the DMA controllers is configurable to access each of the memory devices via a corresponding one of the plurality of memory bus multiplexers;
a plurality of memory bus arbiters each coupled to a respective memory bus multiplexer, wherein each of the plurality of memory bus arbiters is configured to set their respective memory bus multiplexers to grant access to the corresponding memory bus in response to one or more access requests from the plurality of DMA controllers;
a plurality of host port interface (HPI) units each coupled to each of the plurality of memory bus multiplexers, and each configured to access each of the memory devices via a corresponding one of the plurality of memory bus multiplexers; and
a plurality of memory bus arbiters each coupled to a respective memory bus multiplexer, and each configured to arbitrate between a local DMA controller, a local HPI unit, and a remote access multiplexer for access to a memory bus.

6. The chip of claim 5, further comprising a plurality of memory bus arbiters each coupled to a respective memory bus multiplexer, wherein each of the plurality of memory bus arbiters is configured to set their respective memory bus multiplexers to grant access to the corresponding memory bus in response to one or more access requests from the plurality of DMA controllers.

7. The chip of claim 6, wherein the arbiters are further configured to resolve conflicts on a round-robin priority basis and grant only one access request at a time.

8. A multi-core digital signal processor, comprising:
a first processor subsystem that includes:
a first processor core;
a first memory device coupled to the first processor core by a first instruction bus;
a first memory bus multiplexer coupled to the first memory device by a first memory bus;
a first DMA controller coupled to the first memory bus multiplexer and configured to control the first memory bus to access the first memory device;
a first HPI unit coupled to the first memory bus multiplexer and configured to control the first memory bus to access the first memory device; and
a first remote access multiplexer coupled to the first memory bus multiplexer; and
a second processor subsystem that includes:
a second processor core;
a second memory device coupled to the second processor core by a second instruction bus;
a second memory bus multiplexer coupled to the second memory device by a second memory bus;
a second DMA controller coupled to the second memory bus multiplexer and configured to control the second memory bus to access the second memory device;
a second HPI unit coupled to the second memory bus multiplexer and configured to control the second memory bus to access the second memory device; and
a second remote access multiplexer coupled to the second memory bus multiplexer,
wherein the first DMA controller is coupled to the second remote access, multiplexer and is configured to control the second memory bus to access the second memory device, and
wherein the second DMA controller is coupled to the first remote access multiplexer and is configured to control the first memory bus to access the first memory device.

9. The processor of claim 8, wherein the first HPI unit is coupled to the second remote access multiplexer and is configured to control the second memory bus to access the second memory device, and wherein the second HPI unit is coupled to the first remote access multiplexer and is configured to control the first memory bus to access the first memory device.

10. The processor of claim 8, further comprising a first arbiter coupled to the first memory bus multiplexer and configured to arbitrate between the first DMA controller, the first HPI unit, and the first remote access multiplexer for control of the first memory bus.

* * * * *